United States Patent

[11] 3,608,538

| [72] | Inventor | Hermenegildo P. Guerrero<br>7641 W. 61st Place, Argo, Ill. 60501 |
|---|---|---|
| [21] | Appl. No. | 826,544 |
| [22] | Filed | May 21, 1969 |
| [45] | Patented | Sept. 28, 1971 |

[54] COMBINATION LUNCHBOX PROVIDED WITH MEANS FOR HEATING FOOD AND THE LIKE
5 Claims, 4 Drawing Figs.

| [52] | U.S. Cl. | 126/266, 126/38 |
|---|---|---|
| [51] | Int. Cl. | F24c 5/20 |
| [50] | Field of Search | 126/38, 44, 265, 266, 267; 431/344 |

[56] References Cited
UNITED STATES PATENTS

| 2,973,756 | 3/1961 | Tylle | 126/266 |
|---|---|---|---|
| 3,006,406 | 10/1961 | Goddard | 126/44 X |
| 3,189,016 | 6/1965 | Corlet | 126/38 |
| 3,292,668 | 12/1966 | Little | 126/38 X |
| 3,398,732 | 8/1968 | Barker | 126/38 X |

*Primary Examiner*—Charles J. Myhre
*Attorney*—Max R. Kraus

ABSTRACT: A lunchbox provided with means for receiving a displaceable container of liquid gas which supplies fuel to a burner element contained within the lunchbox to thereby heat the food and the like, and in which the lunchbox has a compartment for storing other objects, such as a vacuum bottle, food, and the like.

PATENTED SEP 28 1971
3,608,538
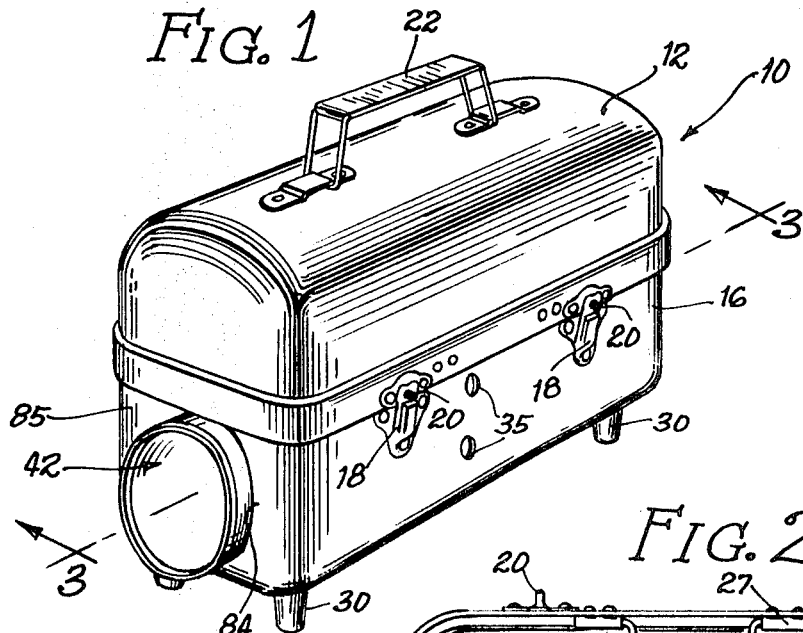
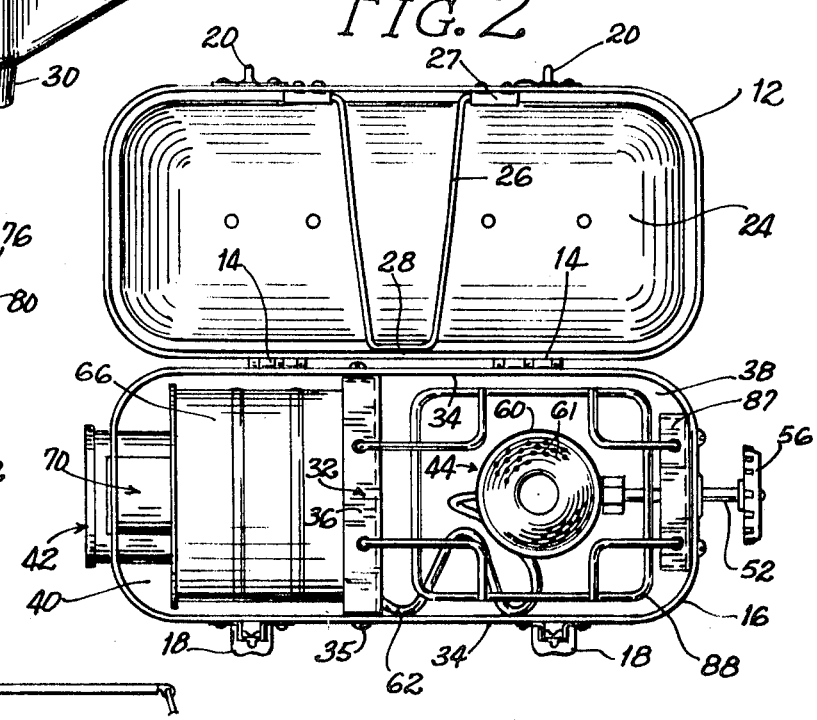
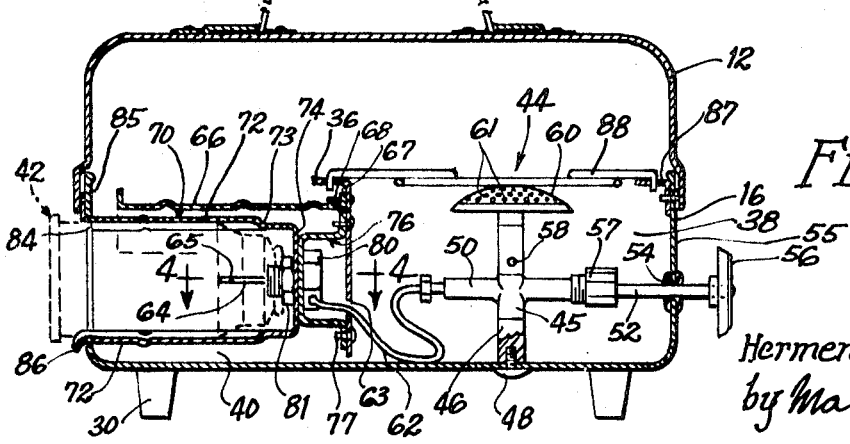
INVENTOR
Hermenegildo P. Guerrero
by Max R. Kraus
Att'y

COMBINATION LUNCHBOX PROVIDED WITH MEANS FOR HEATING FOOD AND THE LIKE

BRIEF SUMMARY OF THE INVENTION

The prior art shows 62 types of lunchboxes which have electrically operated heating elements which serve to heat the food when hot food is desired, however, such electrically operated devices have shortcomings in that the availability of an electrical outlet is necessary and in a good many instances it is impossible or inconvenient to locate such an outlet, particularly in building construction or other types of work which is done outside the building or premises. Even when used inside a plant where electrical outlets are available it is necessary to locate same and make the electrical connection, which at times is inconvenient. The present invention eliminates the foregoing objectionable features in providing a self-contained unit which supplies its own fuel and when the fuel is expended it can be readily replaced by another fuel container readily available on the market.

With the foregoing and other objects which will appear as this description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

In the drawings:

FIG. 1 is a perspective view showing the lunchbox in closed and carrying position.

FIG. 2 is a plan view showing same in open position as when used in heating.

FIG. 3 is a sectional view taken on line 3—3 of FIG. 1, and

FIG. 4 is an enlarged sectional view taken on line 4—4 of FIG. 3. The invention is shown embodied as a part of a lunchbox which is portable and is capable of carrying therewithin a thermos bottle and food to serve as a meal. The principal object of this invention is in having a heating unit for heating the contents of a thermos bottle and/or the food readily available when desired.

As illustrated in the drawings, the lunch box consists of a boxlike container generally indicated at 10 and generally rectangular in shape and of conventional size, which includes a cover 12 hingedly secured as at 14 to the lower housing 16. The lower housing 16 is provided with a conventional locking or clasp means 18 which engages the conventional pins 20 on the cover. The conventional collapsible handle 22 is provided on the cover for carrying the lunchbox.

The interior of the cover 12 provides a compartment 24 for a thermos bottle and/or for food. A wire member 26 pivotally secured as at 27 extends across the interior of the compartment 24 and is suitably latched or held in a locking position, as shown in FIG. 2, by engaging the wall of the cover as at 28 to retain the thermos bottle and/or food in the compartment, as is well understood. Legs 30 extend from the bottom of the housing 16.

The interior of the lower housing 16 provided with a vertical partition or wall 32 which is suitably affixed to the opposite sidewalls 34 of the housing by fastening elements 35 or by welding. The partition 32 has a horizontal flange 36 at the top thereof. The partition divides the interior of the lower housing 16 into two compartments 38 and 40. Compartment 38 serves as a burner compartment and compartment 40 received a replaceable fuel can 42.

A burner generally indicated at 44 is centrally supported in compartment 38. The burner 44 includes a vertically positioned pipe 45 which is secured at the bottom to a stem 46 suitably secured as at 48 to the bottom wall of the housing. A cross or horizontally positioned pipe 50 extends through and communicates with the vertical pipe 45. An adjustable valve stem 52 is supported in the cross pipe 50 and same extends outwardly through an opening 54 in the end wall 55 of the lower housing 16. A knob 56 is one the end of the valve stem 52 for manual rotation of the valve stem to control the flow of the fuel to the burner. A coupling sleeve 57 is threadedly secured to the cross pipe 50 at one end thereof. The vertical pipe 45 is provided with air inlet openings 58 and a burner head 60 provided with the usual openings 61 is threadedly secured to the top of the vertical pipe.

A conduit or pipe 92 is connected at one end to the opposite end of the cross pipe 50 and said conduit passes through a slot or opening 63 in the partition 32 and the opposite end of the conduit 62 is connected to a horizontally extending hollow pin 64 which serves to receive the fuel from the fuel can, to be described. The pin has an inlet opening 65 on the side which communicates with the hollow interior of the pin.

Secured inside compartment 40 is an arcuate-shaped member 66 provided with ears 67 at one end, which are suitably fastened as at 68 to the vertical partition wall 32 to support the arcuate-shaped member 66. Supported in the compartment 40 below the arcuate-shaped member 66 is a U-shaped member generally indicated at 70, the legs 72 of which are of arcuate shape and are provided with shoulders 73 adjacent the base 74 of member 70. The U-shaped member 70 is secured at its base 74 to a mounting member 76 which in turn is secured as at 77 to the vertical partition 32.

The base 74 of the U-shaped member 70 is positioned adjacent the vertical wall 78 of the mounting bracket 76 and each is provided with a suitable opening through which extends a threaded coupling plug 79 to which nuts 80 and 81 are secured to join the U-shaped member 70 to the mounting bracket 76 to support the member 70. The pin 64 is suitable supported in a horizontal bore in the coupling plug 79 to extend horizontally inward into the compartment 40. The pin 64 is connected to the burner 44 by conduit 62, which conduit passes through an opening in the nut 80. The U-shaped member 70 is formed preferably of metal so that the legs 72 thereof are resilient and the ends thereof extend through an enlarged opening 84 in the end wall 85 of the housing 16. The ends of the legs are flanged as at 86.

The opposite end wall 55 of the housing has a flanged strip 87 secured thereto. A wire grid or grill generally indicated at 88 is positioned over the top of the burner compartment 38, with one of the grids secured to the flange 36 of the partition 32 and the other end secured to the flange strip 87. The central portion of the grid is open so as not to interfere with the flame coming from the burner head 60. The grid serves as a ledge or support on which the item to be heated rests.

A conventional can be liquified petroleum gas fuel, which is a commercial products, indicated by the numeral 42 serves to supply the fuel to the burner 44. The can has the conventional annular top closure or cap 91 which is recessed as at 92 and which has a central opening 93 which receives a rubber plug or bud 94 having a hole which is closed until it is inserted into the compartment 40 to be engaged by the pin 64. When the fuel can is horizontally inserted into the opening 84 of the end wall 85 of the compartment 40 it will urge the resilient legs 72 slightly outwardly to hold and retain the fuel can once it is inserted. The fuel can will not accidentally slip out of its retaining members unless it is manually withdrawn. If desired, an additional holding member may be mounted on the outside of the end wall 85 of the housing to serve as a more positive locking member, but it is not necessary to do so.

The fuel can 42 is inserted into the compartment 40 in a horizontal condition between the legs 72 of the U-shaped member 70 until the rubber plug 94 of the can enters the recess in threaded member 79 and this limits the inward movement and positioning of the fuel can. When the fuel can is thus inserted into the compartment 40 the pin 64 will enter the hole in the rubber plug 94 and the pin will be inside the can with the opening 65 of the pin in communication with the fuel which will pass through the pin 64 and through conduit 63 to the burner head 60 if the valve stem 52 is open to permit passage. The exposed portion of the coupling plug 79 is confined in the recessed cap or closure 91. Once the fuel can is connected to the pin 64 it remains connected until the fuel has been expended. A lit match is applied to the burner head 60 to ignite the burner when the control valve 52 is open. The size of the flame can be controlled. The fuel will not leak from the fuel can and will be retained in the fuel can when the burner valve is closed.

After the fuel has been used up or expended the fuel can can be readily withdrawn from the compartment and a new fuel can can be inserted. Thus, the fuel can be readily replenished by the replacement of a new fuel can and the device is available for the use as desired to heat the food items. The fuel can is kept and retained in the compartment 40 and is held therein in a secure manner by virtue of the resilient legs 72. It is carried with the lunch box and is ready at all times to supply fuel to the burner.

What is claimed is:

1. In combination, a portable lunchbox comprising, a lower housing having spaced sidewalls and end walls and a bottom wall, a cover hingedly secured to one of said sidewalls, means for locking said cover to said lower housing to close the top of said lower housing, a transverse wall in said lower housing dividing said lower housing into a first and second compartment, a burner positioned in said first compartment, a hollow pin supported in said second compartment and extending longitudinally into said second compartment and connected to said burner in said first compartment, an opening in the end wall of said lower housing communicating with the interior of said second compartment, said opening and second compartment adapted to receive a can of liquified gas fuel so that said can is horizontally supported in a longitudinal position within said second compartment so that most of the length of said can is confined within said second compartment, means in said second compartment for retaining said can in said second compartment against accidental displacement, said hollow pin adapted to extend inside said can when said can is within said second compartment so that the liquid gas within said can flows to said burner, valve means for controlling the flow of said liquid gas to said burner, said cover providing a third compartment for storage and the like.

2. A structure as set forth in claim 1 in which the means for retaining the can in said second compartment comprise resilient members positioned inside said second compartment.

3. A structure as set forth in claim 1 in which a grid is positioned over the burner.

4. A structure as set forth in claim 1 in which an arcuate-shaped member is positioned in said second compartment so that it is above the can when the can is within said second compartment.

5. A structure as set forth in claim 1 in which the means for retaining the can in said second compartment comprises a generally U-shaped member having resilient legs, with said legs being of arcuate shape.